(12) United States Patent
Schmidt (10) Patent No.: US 11,014,490 B2
(45) Date of Patent: May 25, 2021

(54) LUMINAIRE, REAR VIEW DEVICE, AND MOTOR VEHICLE HAVING LUMINAIRE

(71) Applicant: MOTHERSON INNOVATIONS COMPANY LTD., London (GB)

(72) Inventor: Oliver Schmidt, Stuttgart (DE)

(73) Assignee: Motherson Innovations Company Ltd., London (GB)

( * ) Notice: Subject to any disclaimer, the term of this patent is extended or adjusted under 35 U.S.C. 154(b) by 0 days.

(21) Appl. No.: 16/954,938

(22) PCT Filed: Dec. 13, 2018

(86) PCT No.: PCT/EP2018/084822
§ 371 (c)(1),
(2) Date: Jun. 17, 2020

(87) PCT Pub. No.: WO2019/121339
PCT Pub. Date: Jun. 27, 2019

(65) Prior Publication Data
US 2020/0377009 A1     Dec. 3, 2020

(30) Foreign Application Priority Data
Dec. 18, 2017   (DE) ..................... 10 2017 130 347.2

(51) Int. Cl.
*B60Q 1/26*     (2006.01)
*F21S 43/40*     (2018.01)
(Continued)

(52) U.S. Cl.
CPC .......... *B60Q 1/2665* (2013.01); *B60R 1/1207* (2013.01); *F21S 43/40* (2018.01);
(Continued)

(58) Field of Classification Search
CPC .... B60Q 1/2665; B60Q 3/258; B60Q 1/2661; B60Q 1/2619; F21S 43/40; B60R 1/1207;
(Continued)

(56) References Cited

U.S. PATENT DOCUMENTS 5,788,357 A * 8/1998 Muth .................... B60Q 1/2665
                                                         362/494
7,293,901 B2 * 11/2007 Tuttle ................... B60Q 1/2665
                                                         362/494
(Continued)

FOREIGN PATENT DOCUMENTS

EP            1652727 A1    5/2006
WO     WO 00/06944 A1    2/2000

OTHER PUBLICATIONS

International Search Report dated Mar. 13, 2019 of International application No. PCT/EP2018/084822.
(Continued)

*Primary Examiner* — Bao Q Truong
(74) *Attorney, Agent, or Firm* — Jones Day (57) ABSTRACT

The invention relates to a lamp (24) for a rear view device of a motor vehicle (42), with at least one light source (26) for emitting light beams, a collection optics (32) for collimating the light beams and a scattering optic (34) downstream of the collection optics (32) in the beam path of the light beams, which has a first main direction of beam (38), which, in the installation position of the lamp (24) in a left-hand drive motor vehicle (42), is directed towards an eye ellipse (46) of a driver of the motor vehicle (42), and has a second main direction of beam (40) which, in the installation position of the lamp (24) in a right-hand drive motor vehicle (42), is directed towards an eye ellipse (44) of a driver of the motor vehicle (42). Furthermore, the invention relates to a rear view device with at least one lamp according
(Continued)

to the invention and a motor vehicle with at least one lamp according to the invention or at least one rear view device according to the invention.

13 Claims, 7 Drawing Sheets (51) Int. Cl.
*B60R 1/12* (2006.01)
*F21V 3/04* (2018.01)
*F21V 5/00* (2018.01)
*G02B 27/30* (2006.01)
*F21Y 115/10* (2016.01)

(52) U.S. Cl.
CPC .............. *F21V 3/049* (2013.01); *F21V 5/008* (2013.01); *G02B 27/30* (2013.01); *B60R 2001/1253* (2013.01); *F21Y 2115/10* (2016.08)

(58) Field of Classification Search
CPC ... B60R 2001/1253; B60R 1/12; F21V 3/049; F21V 5/008; F21V 13/02; F21V 5/002; F21V 5/045; F21V 13/04; G02B 27/30; F21Y 2115/10; F21W 2102/00; F21W 2103/00; F21W 2103/25
See application file for complete search history.

(56) References Cited

U.S. PATENT DOCUMENTS

2005/0201113 A1   9/2005   Tuttle et al.
2006/0012990 A1   1/2006   Walser et al.

OTHER PUBLICATIONS

Written Opinion dated Mar. 13, 2019 of International application No. PCT/EP2018/084822.

* cited by examiner

Fig. 1

PRIOR ART

LUMINAIRE, REAR VIEW DEVICE, AND MOTOR VEHICLE HAVING LUMINAIRE

CROSS-REFERENCE TO RELATED PATENT APPLICATIONS

This application is a National Stage Entry of International Patent Application No. PCT/EP2018/084822, filed Dec. 13, 2018, which claims the benefit of priority to German Patent Application No. DE 10 2017 130 347, filed Dec. 18, 2017, each of which is hereby incorporated by reference in its entirety for all purposes.

BACKGROUND

1. Field of the Invention

The invention concerns a lamp for a rear view device of a motor vehicle, in particular for an external rear view device of a motor vehicle, as well as a rear view device and a motor vehicle each with such a lamp.

2. Related Art

A rear view device for a motor vehicle provides an image of the rear part of the motor vehicle which at least meets the legal requirements and belongs to a subgroup of devices for indirect vision. These provide images and views of objects which are not in the direct field of vision of a driver, i.e. in directions opposite, left, right, below and/or above the driver's line of vision. The driver's view may not be fully satisfactory, in particular in the direction of vision. For example, there may be obstructions to vision caused by parts of the driver's own vehicle, such as parts of the carriage, in particular the A-pillar, the roof structure and/or the bonnet, and obstructions to vision caused by other vehicles and/or objects outside the vehicle which may obstruct vision in such a way that the driver cannot fully satisfactorily grasp a driving situation or can only grasp it incompletely. In addition, the driver may not be able to perceive the situation presented to him in or away from the line of vision in the way that would be necessary to control the vehicle according to the situation. Therefore, a rear view device may also be designed to process the information according to the driver's abilities in order to give him the best possible understanding of the situation.

Various functions and devices may be incorporated in and/or controlled by rear view devices, including in particular cameras. Particularly useful are functions and devices for improving, extending and/or maintaining the functionality of the rear view device under normal or extreme conditions. This can include heating and/or cooling means, cleaning means such as wipers, liquid and/or gaseous sprays, actuator means for moving the rear view device or parts thereof, such as a display, a camera system and/or parts of a camera system comprising for example lenses, filters, light sources, adaptive optics such as deformable mirrors, sensors and/or mirrors, and/or actuator means for inducing movements of other objects, for example parts of the vehicle and/or objects surrounding the vehicle.

Furthermore, the rear view device may comprise linear guides and/or rotating wheels, such as a filter wheel, for the interchange of optical elements, for example comprising lenses, mirrors, light sources, sensors, adaptive optics such as deformable mirrors and/or filters.

Other devices can be incorporated in rear view devices and/or other devices may be controlled by means of rear view devices, such as any type of light module comprising an external light module, an internal light module, a front light, a rear light, a front fog lamp, a stop lamp, an acceleration lamp, a flashing light, a logo light, an apron light, a ground light, a puddle light, a strobe light, a navigation light, a position light, an emergency light, a headlamp, a green light, a red light, a warning light, a flashing light module, a proximity light, a search light, an information light, an indicator and/or the like Further examples of functions and devices integrated in and/or controlled by rear view devices may include, for example, a fatigue detection system, a microsleep detection system, a distance and/or speed determination system, for example a LIDAR (light detection and distance detection) system, a blind spot indication system, a lane change assistance system, a navigation assistance system, a tracking assistance system, a man-machine interaction system, a machine-machine interaction system, an emergency and precautionary action assistance system, such as an accident avoidance assistance system, a countermeasure assistance system a brake assist system, a steering assist system, an acceleration assist system, an escape assist system comprising for example an ejection seat system, a direction indicator, a blind spot indicator, a proximity system, an emergency braking system, a charge status indicator, a vehicle mode system comprising for example a sport mode system, an economy mode system, an autonomous driving mode system, a sleep mode system and/or an anti-theft system, a vehicle locked indication system, a vehicle stolen display, a warning signal system, a temperature indicator system, a weather indication system, a traffic light signal system, a fuel status system and/or any combination thereof.

Lighting devices for rear view devices and/or light guides therefor are described in German patent application No 102012108488, German patent application No 102012104529, German patent application No 102012107833, German patent application No 102012107834, European patent No 2738043, European patent No 2947378, international patent application No 2015/173695, European patent application No. 3045944, U.S. patent application Ser. No. 15/228,566, U.S. patent application Ser. No. 15/000,733, international patent application No. 2016/147154, U.S. patent application Ser. No. 15/256,532, German patent application No. 102015115555, European patent application No. 3144183 of the applicant.

In particular, a camera module may have a large number of different optical elements, including, inter alia, a large number of different sensors and light sources, and housing parts. The housing of a camera module may be made of plastic, metal, glass, another suitable material and/or any combination thereof and may be used in combination with the techniques described below to change or modify the properties of the material or the material surface. Housings are disclosed for example in the German patent application No. 102016108247.3.

The camera may include, for example, CCD or CMOS or light field sensors as described, for example, in German patent application No. 102011053999 and U.S. Pat. No. 6,703,925. Also, an area of the sensor may be reserved for various purposes, for example, to detect a test beam, as disclosed in U.S. Pat. No. 8,031,224.

The optical elements may be moulded or designed from any type of glass or any other suitable material. Glass is used here in the sense of a non-crystalline amorphous solid that exhibits a glass transition when heated towards the liquid state. It includes for example the group of polymer glasses, metal glasses, silica glasses, but any other suitable material showing the glass transition can also be used. The glass can be either flat, wedge-shaped, rectangular, cylindrical, spherical, conical, elliptical and/or circular, as described for example in the German patent application No. 102016108247.3 and the German patent application No. 102011103200, or it can have a shape according to different needs or types of lenses. As non-restrictive examples, camera modules can be equipped with lenses, such as a wide-angle or fisheye lens capable of providing peripheral images, as described in the U.S. patent application Ser. No. 15/281, 780 and U.S. patent application Ser. No. 13/090,127, a Fresnel lens or micro lenses as described in German Patent Application No. 102011053999, or a TIR lens (Total Internal Reflection Lens) as described in U.S. Pat. No. 8,740,427. The German patent application No. 10201610109159 describes, for example, a lens comprising at least one first interface which functions as a refractive entrance surface for at least one light beam, at least one second interface which functions as a totally internal reflecting surface, TIR surface, for the light beam entering the lens through the first interface, and at least one third interface which functions as a refractive exit surface for the light beam reflected at the second interface, the second interface and the third interface being shaped such that at least two light beams, which have a diverging angle to one another and impinge on the first boundary surface at any desired solid angle, emerge from the lens in the region of the third boundary surface substantially parallel to one another and in a common spatial direction, the third boundary surface being shaped in such a way that it has, at least in some areas, a normal vector which is neither parallel nor antiparallel to the spatial direction, and the at least two light beams being substantially non-parallel to one another until they emerge from the third surface, and a method for producing a lens.

Another type of optical elements known to be used in camera modules are optical fibers, in particular in the form of fiber bundles and preferably in the form of fiber bundles with an optical head, as described for example in U.S. patent application Ser. No. 09/771,140. Various methods can be used to produce such optical elements, such as the method described in U.S. Pat. No. 8,460,060. The optical elements can be transparent, as for example described in U.S. Pat. No. 8,031,224, German Patent Application No. 102016108247.3 and U.S. patent application Ser. No. 13/242,829. But the optical elements can also be semi-transparent, as described in the U.S. patent application Ser. No. 09/771,140 and the U.S. patent application Ser. No. 13/090,127. Furthermore, the optical elements can be fully or partially coated with different types of coatings to achieve different effects, such as anti-reflection coatings, see U.S. Pat. No. 8,031,224, chromium-based reflective coatings, see U.S. Pat. No. 9,181, 616, and other coatings, such as for polymeric substrates described in U.S. patent application Ser. No. 14/936,024 and U.S. patent application Ser. No. 15/124,310. Preferably, the optical elements are made of a scratch-resistant material, as described for example in the German patent application No. 102016108247.3. The optical elements may have outcoupling structures at certain positions of the optical elements, and an optical film, for example an extrusion film, and a formed coating may be applied as described in the German patent application No. 102011103200. A coating for spectral and voltage control is described in the U.S. patent application Ser. No. 15/124,310. Various filters can be integrated into the optical elements, such as gray filters or polarization filters described in the U.S. patent application Ser. No. 14/809,509. Electrochromic substrates, polymer electrolytes and other charge-conducting media may be included for the optical elements based on the descriptions as disclosed in European Patent Application No. 08103179.1, European Patent No. 2202826, U.S. Pat. Nos. 7,999,992 and 8,537, 451.

The camera module may also be equipped with light intensity control devices as described in U.S. patent application Ser. No. 14/809,509 and may have light level amplifier tubes as described in U.S. patent application Ser. No. 09/771,140. The electrochromic substrates and devices used in European Patent Application No. 08103179.1, European Patent No. 2202826, U.S. Pat. Nos. 7,999,992 and 8,537,451 can also be used for this purpose, as well as a transflector for transmitting or reflecting light based on a corresponding input signal, as described in German Patent Application No. 102016106126.3.

The camera module or a cover adapted to the camera module can be moved with different actuators, drives and/or a flexible track, as described for example in the German application no. 102016108247.3 and the U.S. patent application Ser. No. 15/281,780. Furthermore, the camera module can also include cleaning elements to clean the optical element that is facing outwards and exposed to the environment. The cleaning element may include wipers, brushes, lips, nozzles, fans and similar elements as described in European Patent Application No. 14165197.6, U.S. patent application Ser. No. 15/281,780, German Patent Application No. 102016108247.3, European Patent Application No. 13163677.1, European Patent Application No. 15173201.3 and European Patent No. 1673260. The cleaning devices are not limited in their composition and may comprise, for example, any fabric, elastomer, sponge, brush or combination thereof. Special wiper elements comprising wiper arms, wiper blades, wiping cloths, wiping fabrics and combinations thereof are described in European patent application No 14165197.6. For example, a wiper element may be controlled by the method described in European patent application No 130164250.6. A reservoir for holding a cleaning fluid, as described in European patent application No. 14165197.6, may be attached to or integrated into the camera module to supply the cleaning fluid to the optical elements of the camera module.

Various methods can be used to detect dirt or other turbidity that prevents or deteriorates the functioning of the camera module as described in U.S. Pat. No. 8,395,514, European Patent No. 1328141, and U.S. Pat. No. 8,031,224. Light sources can also be built into or integrated into the camera module to increase the visibility of surrounding objects, measure distances and directions and detect dirt, as described in U.S. Pat. No. 8,031,224, U.S. Patent Application No. 62/470,658 and U.S. patent application Ser. No. 09/771,140.

It is known to provide heating devices for such cameras or protective glasses. For this purpose, for example, heating foils are glued or laminated to the protective glass. Such a solution is costly to manufacture and has only a low heating power due to the low thermal mass of such a heating foil. Various heating means such as heating coils, heating devices integrated into the lens holder or the bezel or other heating elements can be used to prevent condensation and icing on the surface of optical elements, as for example in the German patent application No. 102016108247.3 and the U.S. patent application No. 62/470,658.

Waterproof seals against weathering as well as against the influence of washing processes with detergents, solvents and high-pressure cleaners can be used on the housing of the camera module, as described for example in the U.S. patent application Ser. No. 13/090,127. Alternatively, the housing may be made of a body consisting of plastic and conductive material, wherein the conductive material being distributed in the plastic material to form a conductive mass to allow to connect a power source, preferably a DC power source, to the body via at least two electrodes and to heat the body accordingly. A conductive track may be embedded in plastic parts of the camera module as described in European Patent No. 1328141 and U.S. Pat. No. 7,083,311.

The camera module may include an energy collection system as described for example in the European patent application No. 09171683.7. A fault detection system for electrical consumers, as described in U.S. Pat. No. 8,487,633, may be used to detect failure of the camera module.

Various types of fasteners can be used to attach the camera module to the vehicle or other components, such as the snap-on connection described in European Patent No. 2233360.

Various control means and analysis devices can be used, such as the calculation units described in U.S. patent application Ser. No. 13/090,127, German Patent Application No. 102016106126.3, German Patent Application No. 102011053999, European Patent Specification No. 2146325 and U.S. Pat. No. 8,849,104. Additionally, the HDR technology (High Dynamic Range) according to the U.S. patent application Ser. No. 14/830,40, can be used.

In rear-view devices, such as exterior rear-view mirrors of motor vehicles, more and more indicator lamps are therefore being installed to provide a driver of the motor vehicle with additional information about the driving status and/or traffic conditions. These can be warning lights for driver assistance systems, for example, which indicate to the driver that there is a vehicle in the blind spot of the rear view device or that it is safe or not safe to change lanes.

Such a lamp is known from DE 20 2012 013 353 U1, for example. This known lamp comprises a light source, a collection optics in the form of a hollow light guide and a diffusing optic.

Figure 1:
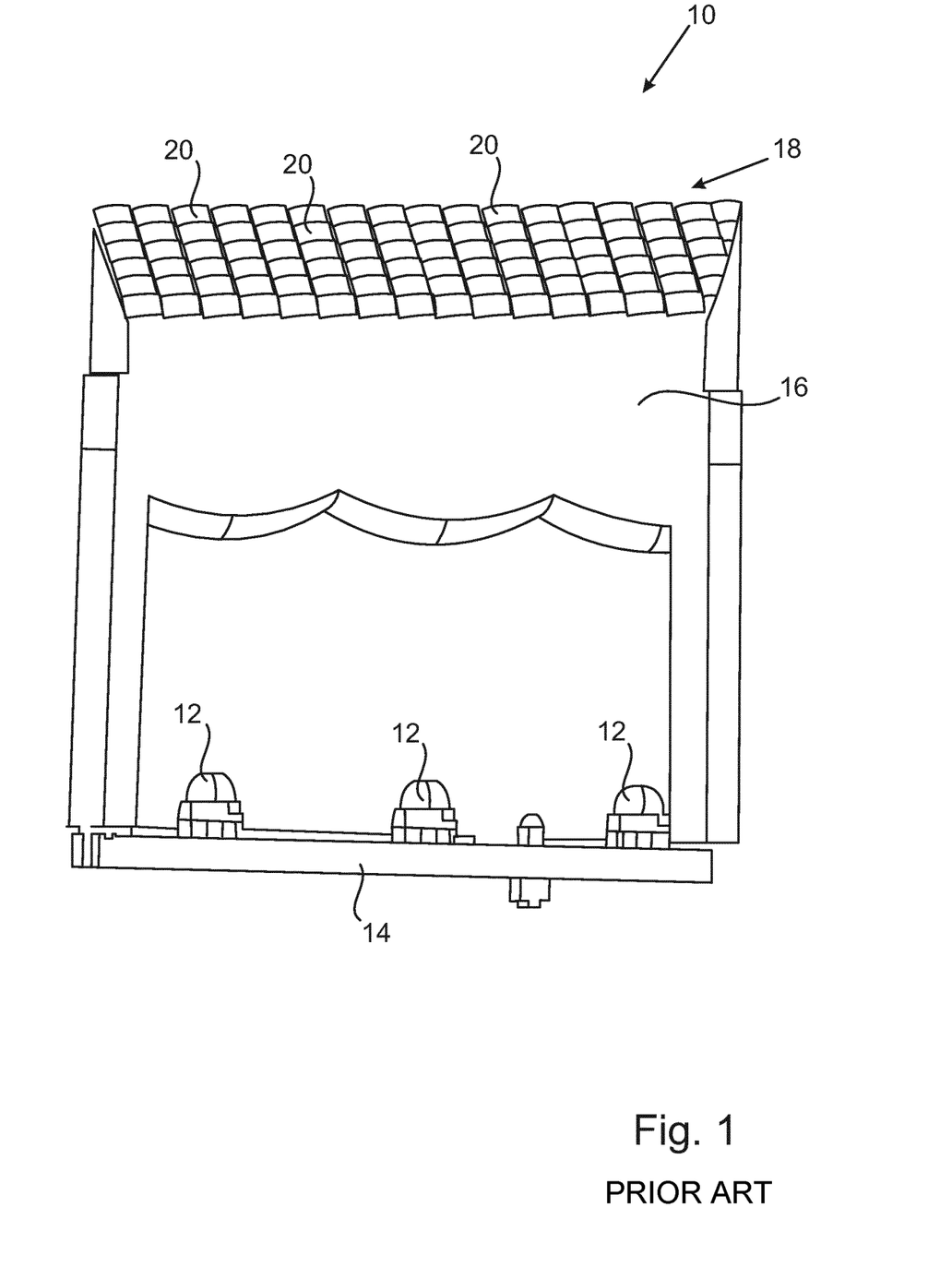
FIG. 1 a schematic representation of a lamp according to a design example based on the state of the art.

A lamp designated 10 as a whole, as also known from the state of the art and shown in FIG. 1, comprises several illuminants 12 arranged on a circuit board 14. In the example shown in FIG. 1, the light of the illuminants 12 is collimated by a collection optics 16 and directed to a scattering optics 18. The scattering optics 18 comprises a plurality of scattering elements 20, which are arranged on a flat surface of the collecting optics 16 facing away from the illuminants 12.

Figure 2:
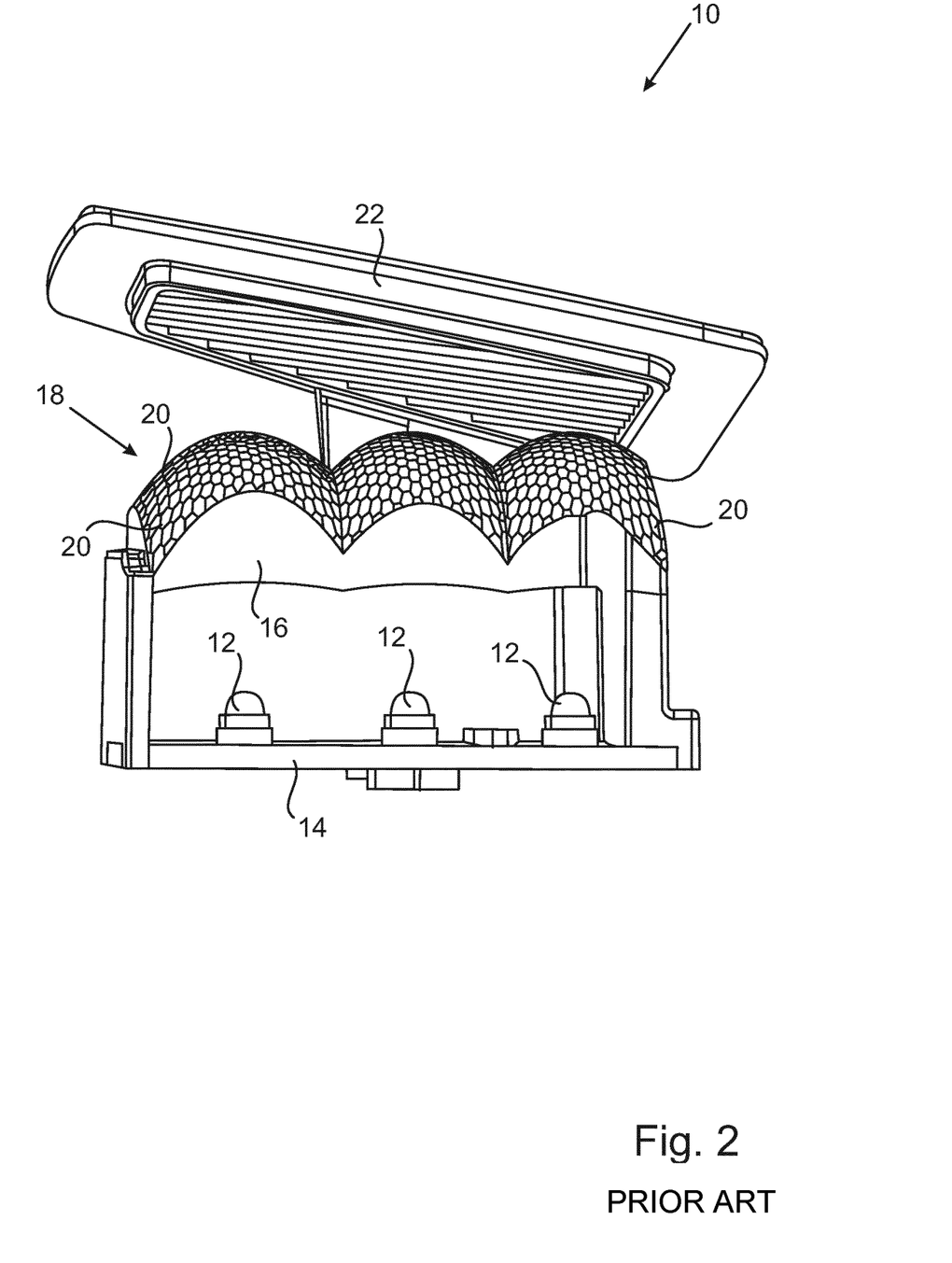
FIG. 2 a schematic representation of a lamp according to an alternative design example based on the state of the art.

Alternatively, as shown in FIG. 2, it is known from the state of the art to use a concave-convex lens arrangement as collection optics 16, where the scattering elements 20 of the scattering optics 18 are formed as hexagonal elements directly on the convex surface of the collection optics 16. In addition, according to FIG. 2, an aperture 22 is provided through which the light is directed to an observer.

To their detriment, such lamps 10 often have a very inhomogeneous luminance distribution and emit the light generated by lamps 12 only along one main beam direction. If such a lamp 10 is thus to be used as an indicator lamp for a rear view device of a motor vehicle, different designs are necessary for motor vehicles with right-hand drive and motor vehicles with left-hand drive. Even in this case it cannot always be guaranteed that lamp 10 can be reliably perceived from all viewing angles or viewing positions of a driver of the motor vehicle.

The problem with known lamps is therefore that, normally, lamps designed differently for right-hand drive and left-hand drive vehicles must be used to ensure that the lamp is visible to the driver. In addition, there is often the problem that the luminance of such a lamp is not constant over the entire possible viewing angle, resulting in an aesthetically unattractive appearance or, in the worst case, if the driver's head is in an extreme position, the lamp cannot be perceived correctly.

It is therefore the object of the present invention to provide a light fitting which overcomes the disadvantages of the state of the art. In particular, it should have a particularly homogeneous luminance and be usable in both right-hand drive and left-hand drive motor vehicles without modification.

According to the invention, this task is solved by a lamp for a rear view device of a motor vehicle, with at least one light source for emitting light beams, a collection optics for collimating the light beams and a scattering optics downstream of the collection optics in the beam path of the light beams, which has a first main direction of beam, which, in the installation position of the lamp in a left-hand drive motor vehicle, is directed towards an eye ellipse of a driver of the motor vehicle, and has a second main direction of beam, which, in the installation position of the lamp in a right-hand drive motor vehicle, is directed towards an eye ellipse of a driver of the motor vehicle.

The eye ellipse describes a virtual area in which the eye position of a driver of a motor vehicle can be statistically expected. The position of the eyes depends mainly on the height or leg length of the driver. Usually, the eye ellipse is defined to include all eye positions for possible drivers in the 95% percentile of the size distribution over all drivers.

The design of the lamp according to the invention makes it possible to install identical lamps in right-hand drive and left-hand drive motor vehicles. This eliminates additional costs that would be incurred by developing specifically adapted lights for the two different types of motor vehicle and by providing different tools. Such a lamp is therefore particularly cost-effective to manufacture and to develop. Furthermore, the scattering optics achieve a particularly homogeneous light distribution, ensuring that the light is always reliably visible to the driver.

In a preferred embodiment of the invention, the scattering optics comprise a plurality of cushion-shaped scattering elements. These may alternatively also be prism-shaped. In this way a particularly homogeneous light distribution over the surface of the scattering optics is achieved.

In another preferred embodiment of the invention, the cushion-shaped scattering elements have an edge length of less than 1 mm, in particular of less than 0.2 mm. At the usual viewing distance to such a lamp, the individual scattering elements are thus not recognizable as such, the scattering optics is rather perceived as a homogeneous luminous surface, which leads to a particularly good visibility and aesthetic impression.

In another preferred embodiment of the invention, the cushion-shaped scattering elements have a horizontal radius of 0.9 mm to 1 mm in the installation position of the lamp and/or a vertical radius of 1 mm to 1.2 mm in the installation position of the lamp. This enables a particularly fine adjustment of the beam geometry so that the desired main beam directions can be achieved without any problems.

In another preferred embodiment of the invention, the scattering optics form a symbol, logo, indication and/or warning in the first and second main direction of beam. This can be achieved by the arrangement of the individual scattering elements. However, it is also possible to use a mask or the like. This can be used to transmit specific information to the driver of the motor vehicle so that, for example, different symbols can be displayed when a lane change or overtaking is possible or not possible.

In another preferred embodiment of the invention, the collection optics comprise at least one TIR (total internal reflection) lens, a specular paraboloid surface, a paraboloid reflector, a Fresnel lens and/or a collecting lens. The converging lens can be concave-convex or plano-convex. The only important thing is that the light provided by the at least one light source is homogeneously collimated by the collection optics and directed onto the scattering optics.

In another preferred embodiment of the invention, a focal length of the collector optics is equal to a distance between the collector optics and the at least one light source. In this way a particularly good and homogeneous transmission of the light emitted by the at least one light source to the scattering optics is achieved.

In another preferred embodiment of the invention, a distance between the collection optics and the at least one light source is 15 mm to 30 mm, preferably 22 mm. This results in a particularly compact lamp which can be easily accommodated even in the limited space inside a rear-view device, for example an exterior mirror.

In another preferred embodiment of the invention, at least one light source is a light-emitting diode. A light-emitting diode enables a particularly good light efficiency with low power consumption and low waste heat.

In another preferred embodiment of the invention, the at least one light source is arranged on a board which is mechanically connected to the collection optics, in particular by at least one frame element. In this way, the alignment of the collection optics to the at least one light source is adjusted in a particularly simple and stable manner so that particularly small tolerances occur.

The frame element can be provided by the collection optics or as a separate component, preferably with a fastening device, in particular comprising at least one clip element.

In another preferred embodiment of the invention, the scattering optics and the collection optics are designed as separate components. This allows a particularly high flexibility in the production and design of the lamp.

In a further preferred embodiment of the invention, the scattering optics and/or the collection optics are formed as an injection molded component or injection molded embossed component, wherein a direction of demolding of the injection molded component or the injection molded embossed component corresponds to an optical axis of the scattering optics or the collection optics. In this way a particularly good optical quality of the scattering optics and/or the collection optics is achieved and at the same time the production of the respective components is simplified.

It is preferred that the first main direction of beam is on one side of the optical axis and the second main direction of beam is on the other side of the optical axis.

The invention further relates to a rear view device with at least one mirror element and/or a camera as well as at least one lamp according to the invention. The lamp may be positioned within a housing of the rear view device and/or on the mirror element.

Furthermore, the invention relates to a motor vehicle with at least one lamp of the type described. The housing, the mirror element, the camera and/or the lamp can or can be moved relative to the motor vehicle.

The advantages of the lamp of the invention as described above are also applied to the rear view device and the motor vehicle.

BRIEF DESCRIPTION OF THE DRAWINGS

In the following, the invention and its embodiments are explained in more detail on the basis of the drawing. Thereby shows.

DETAILED DESCRIPTION

Various design examples of a lamp 24 according to the invention are shown in FIGS. 3 to 6. As with the known lamps 10 described in relation to FIGS. 1 and 2, these lamps also have a plurality of light sources 26 on a circuit board 28. The light sources 26 are preferably designed as light emitting diodes. A collector optics 32 is connected to the circuit board 28 via a frame element 30. In all the design examples shown, the collection optics comprise 32 concave-convex collimating lenses. However, it is also possible to use 32 totally reflecting lenses, Fresnel lenses or paraboloid reflector elements as collection optics.

In contrast to the state of the art, a scattering optics 34 is provided as a separate element at a distance from the collecting optics 32. The scattering optics 34 comprises a plurality of cushion-shaped scattering elements 36, which are held by a further frame element 37.

The cushion-shaped diffuser elements 36 preferably have an edge length of less than 1 mm and have a horizontal radius of 0.9 to 1 mm when the lamp 24 is installed and/or a vertical radius of 1 mm to 1.2 mm when the lamp is installed. This allows a particularly homogeneous luminance distribution to be achieved over the entire surface of the scattering optics 34.

Figure 7:
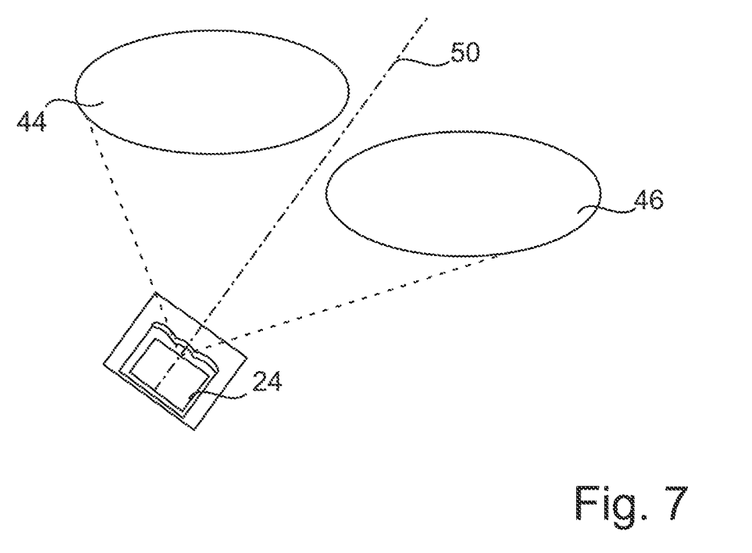
FIG. 7 a schematic representation of the main directions of beam of a lamp according to a fourth example embodiment of the invention.
Figure 8:
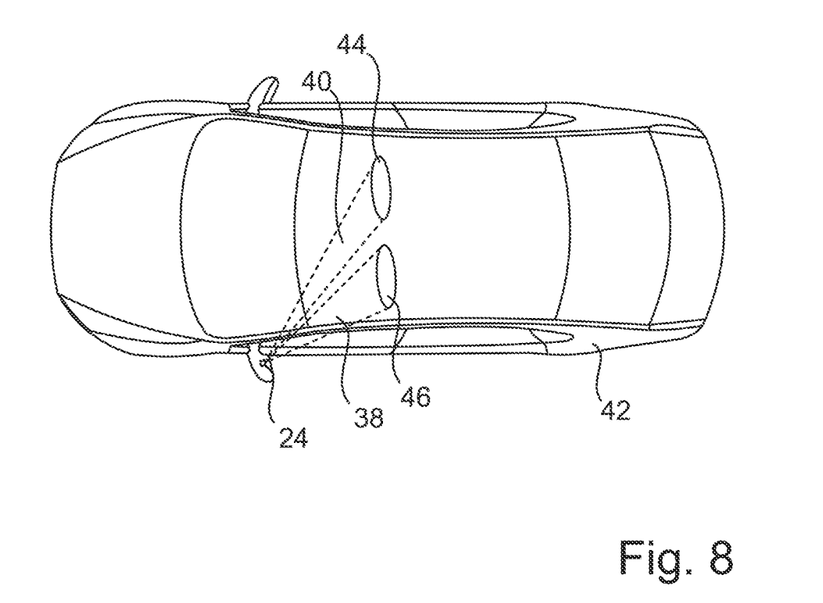
FIG. 8 a schematic diagram showing the main directions of beam of the lamp of FIG. 7 when installed in a motor vehicle.

In addition, the scattering elements 36 may be so arranged that the lamp 24 has two main directions of beam 38, 40 which, when the lamp 24 is installed in a motor vehicle 42, as shown in FIGS. 7 and 8, are directed respectively towards the driver's side and the passenger side of the motor vehicle 42. The two different main directions of beam can be achieved by the arrangement of the individual scattering elements. Thus, the beam geometry of lamp 24 will detect both the eye ellipse 44 of a driver in a left-hand drive vehicle and the eye ellipse 46 of a driver in a right-hand drive vehicle. In other words, the same lamp 24 according to the invention can be installed in both a left-hand drive and a right-hand drive vehicle without the need for design modifications. This reduces the development and production effort for such lights. In this case, the lamp 24 has an optical axis 50, the first main direction of beam 38 running on one side of the optical axis 50 to the driver's eye ellipse 46 in a right-hand drive vehicle and the second main direction of beam 40 running on the other side of the optical axis 50 to the driver's eye ellipse 44 in a right-hand drive vehicle. The optical axis of lamp 24 is defined by the characteristics of lamp 24.

FIG. 8 illustrates the beam geometry of a lamp 24 mounted on the driver's side with respect to a left-hand drive motor vehicle 42. For a lamp 24, which is to be fitted on the passenger side of the motor vehicle 42, only a mirror-symmetrical geometry of the scattering optics 34 must be provided.

By means of masks or also by the arrangement of the scattering elements 36, the scattering optics 34 can be adapted in such a way that a certain symbol or logo is visible to the driver of the motor vehicle when the light sources 26 are activated. This can be used, for example, to display blind spot or lane change warnings.

Figure 3:
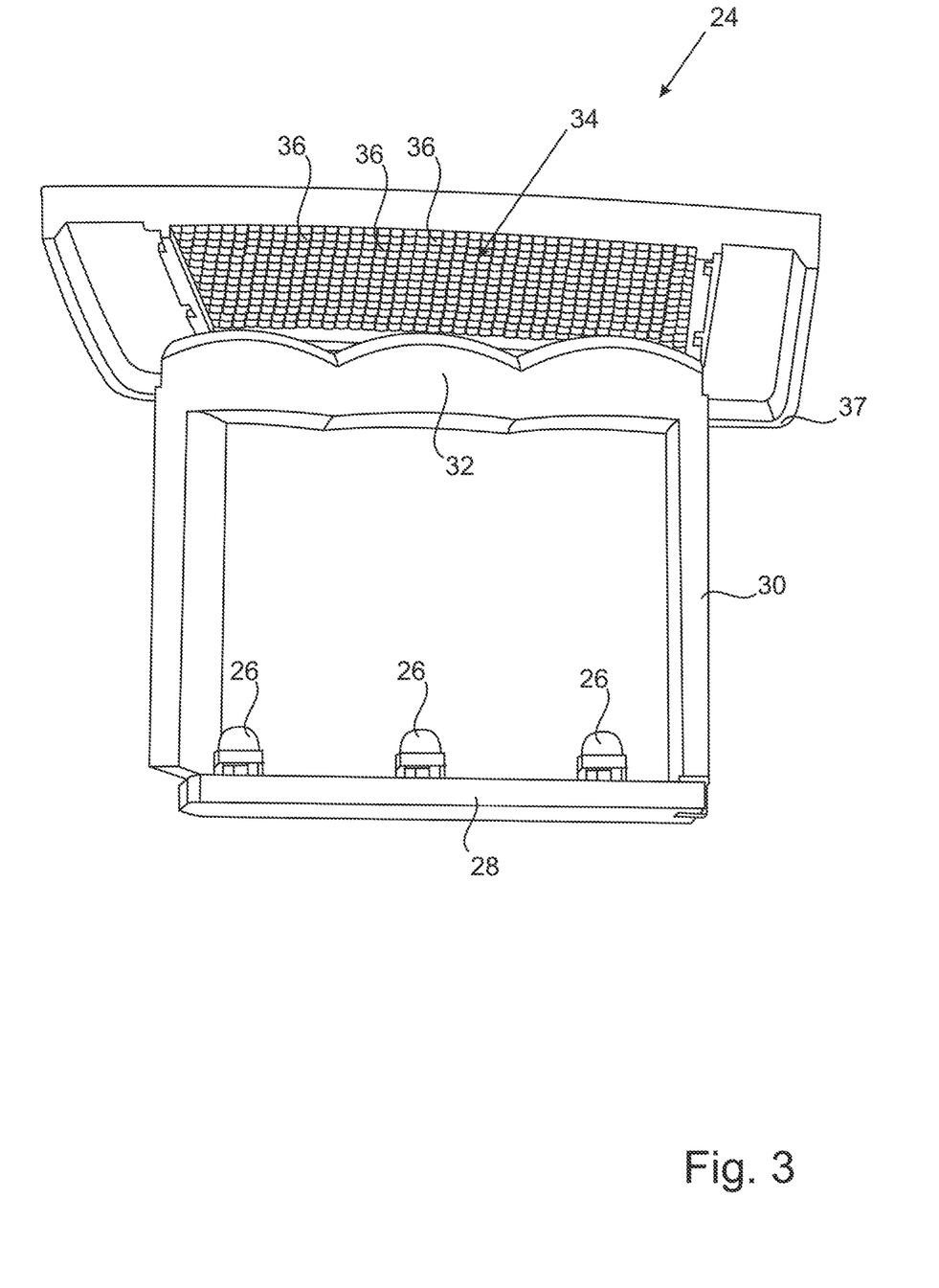
FIG. 3 a perspective view of a lamp according to a first example embodiment of the invention.
Figure 4:
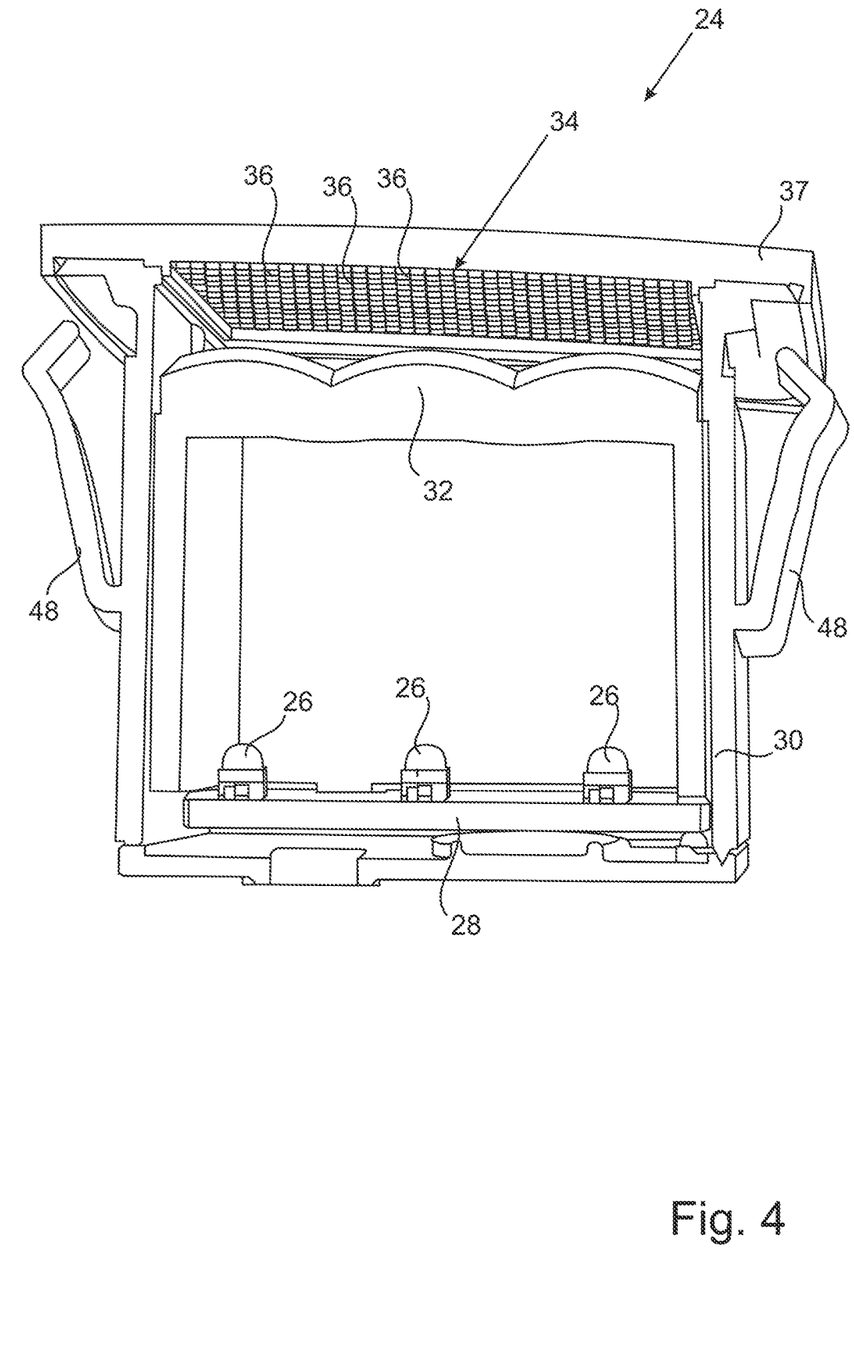
FIG. 4 a perspective view of a lamp according to a second example embodiment of the invention.
Figure 5:
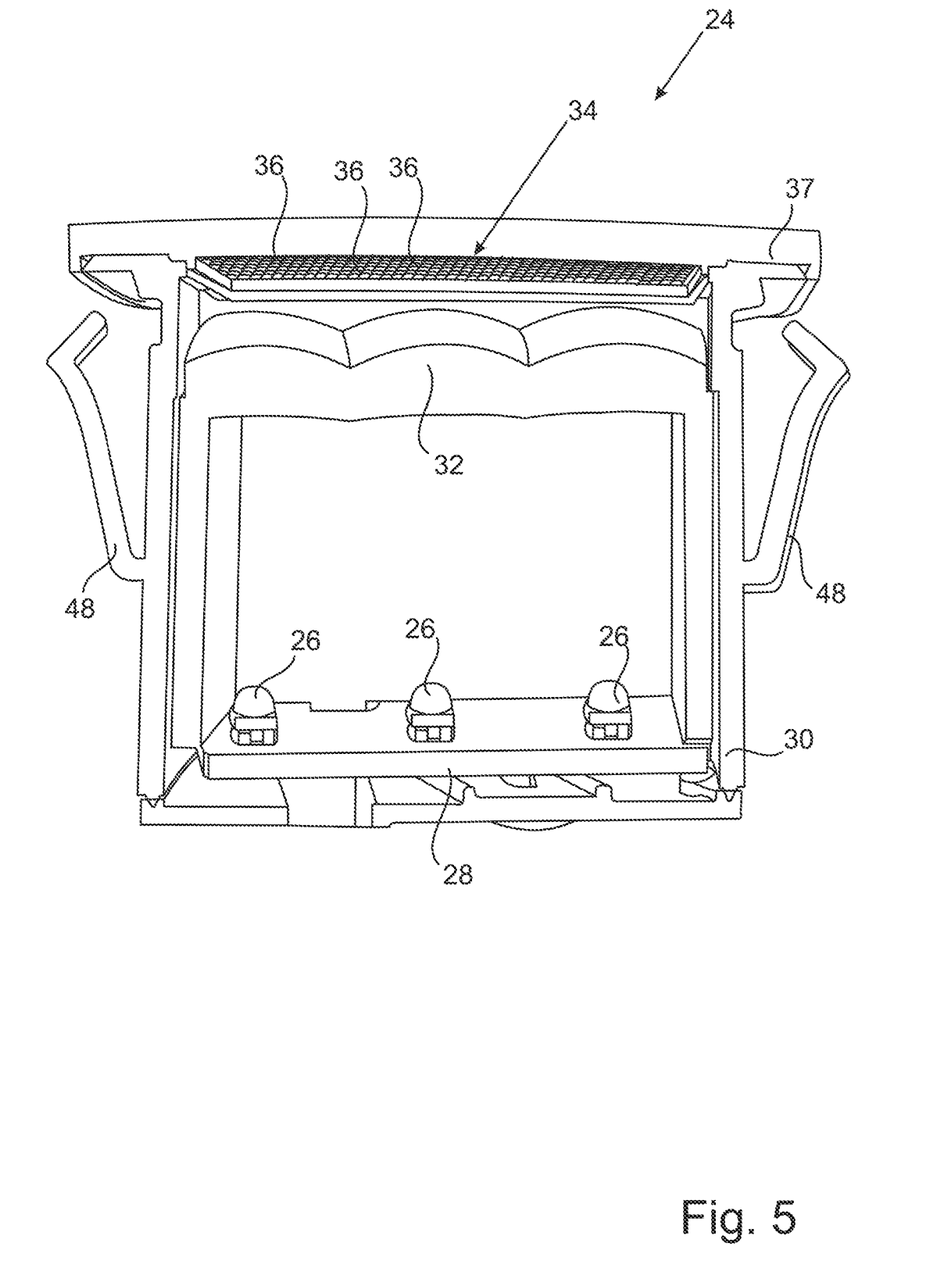
FIG. 5 another perspective view of the lamp from FIG. 4.
Figure 6:
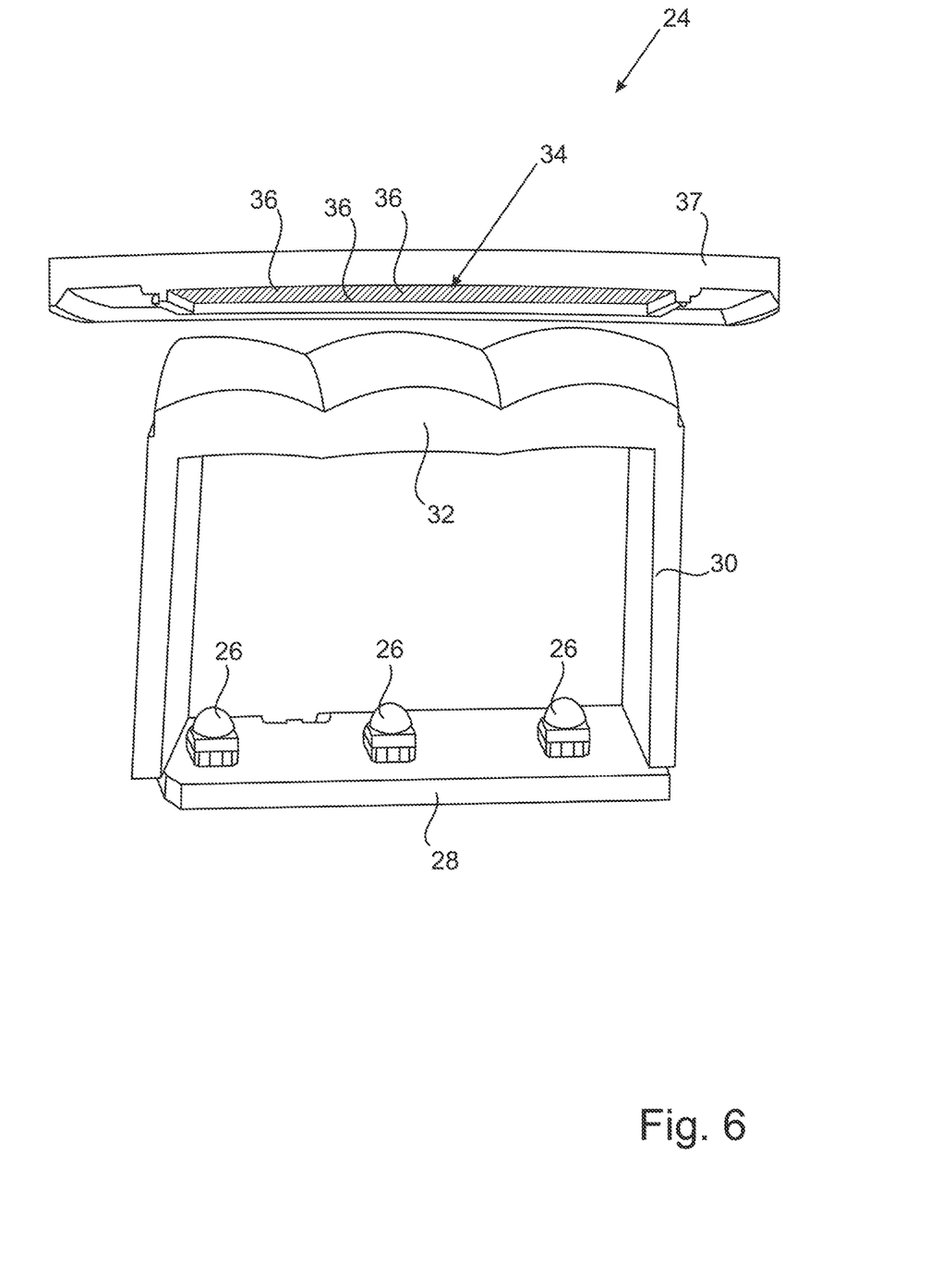
FIG. 6 a perspective view of a lamp according to a third example embodiment of the invention.

In the example embodiment of FIG. 3, the frame element 30 is in a TIR lens type design with the collecting lens 32. As shown in FIGS. 4 and 5, the frame element 30 of the lamp 24 can also be provided as an additional component, i.e. separately from the collection optics 32, and can also include clip elements 48, which enable particularly simple installation of the lamp 24 in a rear view device of a motor vehicle.

The collection optics 32 and/or the scattering optics 34 are preferably designed as injection molded or injection-molded parts. It is advantageous if the direction of demolding of the respective component corresponds to its optical axis 50. The optical axis 50 of lamp 24 can be removed from FIG. 7.

All in all, this results in a lamp 24 that provides both a particularly high and homogeneous luminance and can be installed in left-hand and right-hand drive vehicles without any design changes.

The features of the invention disclosed in the foregoing description, drawings and claims may be essential, either individually or in any combination, for the realisation of the invention in its various embodiments.

LIST OF REFERENCE SIGNS

10 Lamp
12 Illuminant
14 Circuit Board
16 Collection optics
18 Scattering optics
20 Scattering element
22 Aperture
24 Lamp
26 Light sources
28 Circuit board
30 Frame element
32 Collection optics
34 Scattering optics
36 Scattering element
37 Frame element
38 Main direction of beam
40 Main direction of beam
42 Motor vehicle
44 Eye ellipse
46 Eye ellipse
48 Clip element
50 Optical axis

What is claimed is:

1. A lamp for a rear view device of a motor vehicle, comprising:
   at least one light source for emitting light beams;
   a collection optic for collimating the light beams; and
   a scattering optic downstream of the collection optic in the beam path of the light beams, which has a first main direction of beam, which is directed towards an eye ellipse of a driver of the motor vehicle when the lamp is installed in a left-hand drive motor vehicle,
   wherein the scattering optic also has a second main direction of beam, which, in the installation position of the lamp in a right-hand drive motor vehicle, is directed towards an eye ellipse of a driver of the motor vehicle, the eye ellipse corresponding to a virtual surface area in which an eye position of the driver of the motor vehicle can be statistically expected,
   the lamp has an optical axis, and
   the first main direction of beam runs on one side of the optical axis and the second main direction of beam runs on an opposite side of the optical axis.

2. The lamp according to claim 1, wherein the scattering optic has a plurality of cushion-shaped scattering elements, which preferably have an edge length of less than 1 mm, and/or a horizontal radius of 0.9 mm to 1 mm in the installation position and/or a vertical radius of 1 mm to 1.2 mm in the installation position.

3. The lamp according to claim 1, wherein the scattering optic forms a symbol, a logo, an indication and/or a warning in the first and second main direction of beam.

4. The lamp according to claim 1, wherein the collection optic comprises at least one TIR (total internal reflection) lens, a specular paraboloid surface, a paraboloid reflector, a Fresnel lens and/or a collecting lens, and
   wherein the collecting lens is concave-convex or plano-convex.

5. The lamp according to claim 1, wherein at least one of:
   a focal length of the collection optic corresponds to a distance between the collection optic and the at least one light source, and
   a distance between the collection optic and the at least one light source is 15 mm to 30 mm.

6. The lamp according to claim 1, wherein the at least one light source is designed as a light-emitting diode and/or is arranged on a board which is mechanically connected to the collection optic via at least one frame element.

7. The lamp according to claim 1, wherein the frame element is provided by the collection optic or as a separate component with a fastening device comprising at least one clip element.

8. The lamp according to claim 1, wherein the scattering optic and the collection optic are formed as separate components.

9. The lamp according to claim 1, wherein the scattering optic and/or the collection optics are designed as an injection-molded component or injection molded embossed component, and
   wherein a demolding direction of the injection molded component or the injection molded embossed component corresponds to the optical axis of the scattering optic or the collection optic.

10. A rear view device of a motor vehicle, comprising:
    at least one mirror element and/or a camera; and
    the lamp according to claim 1.

11. The rear view device according to claim 10, wherein the lamp is positioned within a housing of the rear view device and/or on the mirror element.

12. A motor vehicle, comprising the rear view device according to claim 10.

13. The motor vehicle according to claim 12, wherein at least one of a housing of the rear view device, the at least one mirror element, the camera, and the lamp is movable relative to the motor vehicle.

* * * * *